Dec. 18, 1934. C. P. WERNER 1,984,557
MIXER AND BEATER
Filed April 2, 1932 2 Sheets-Sheet 2
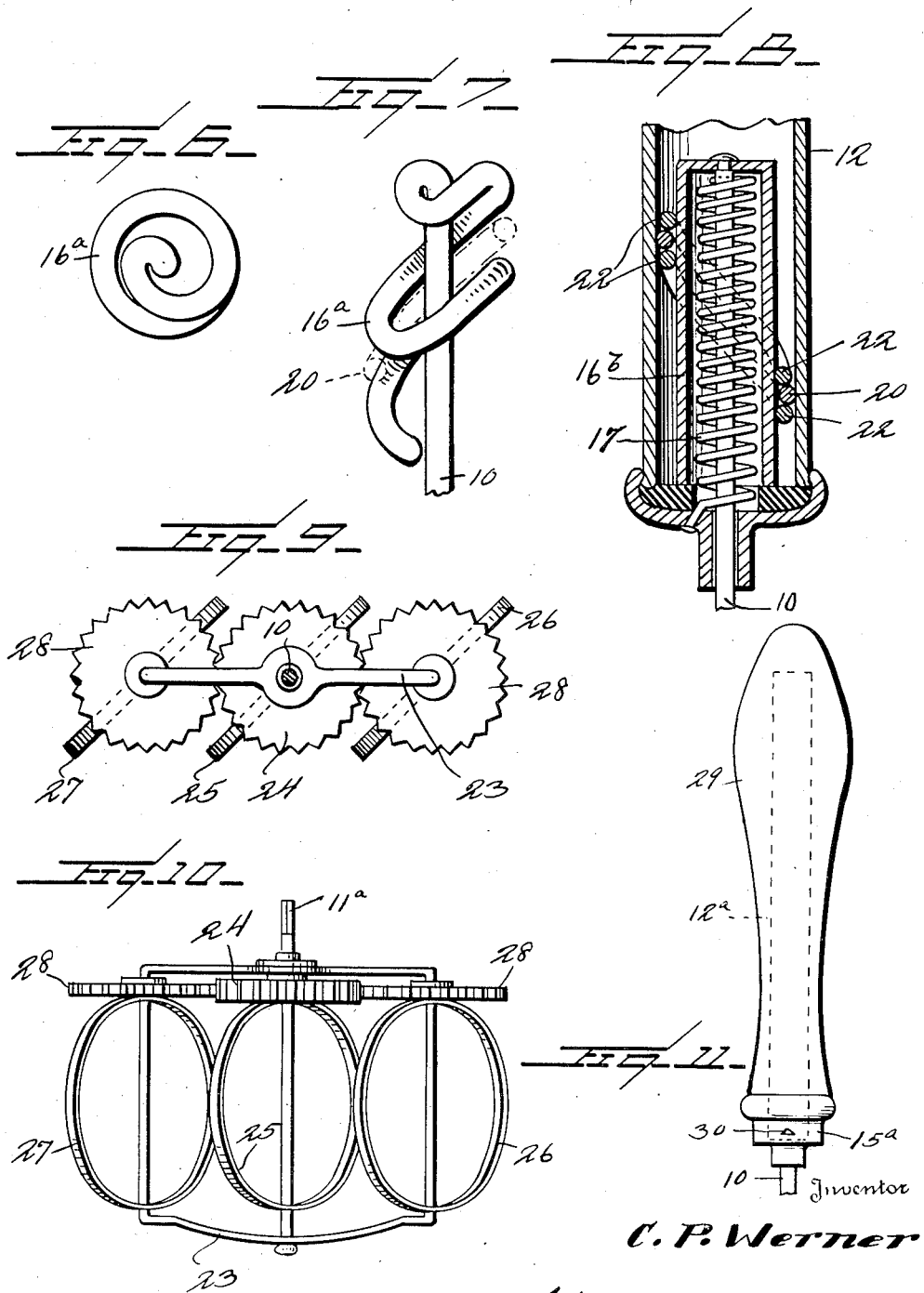

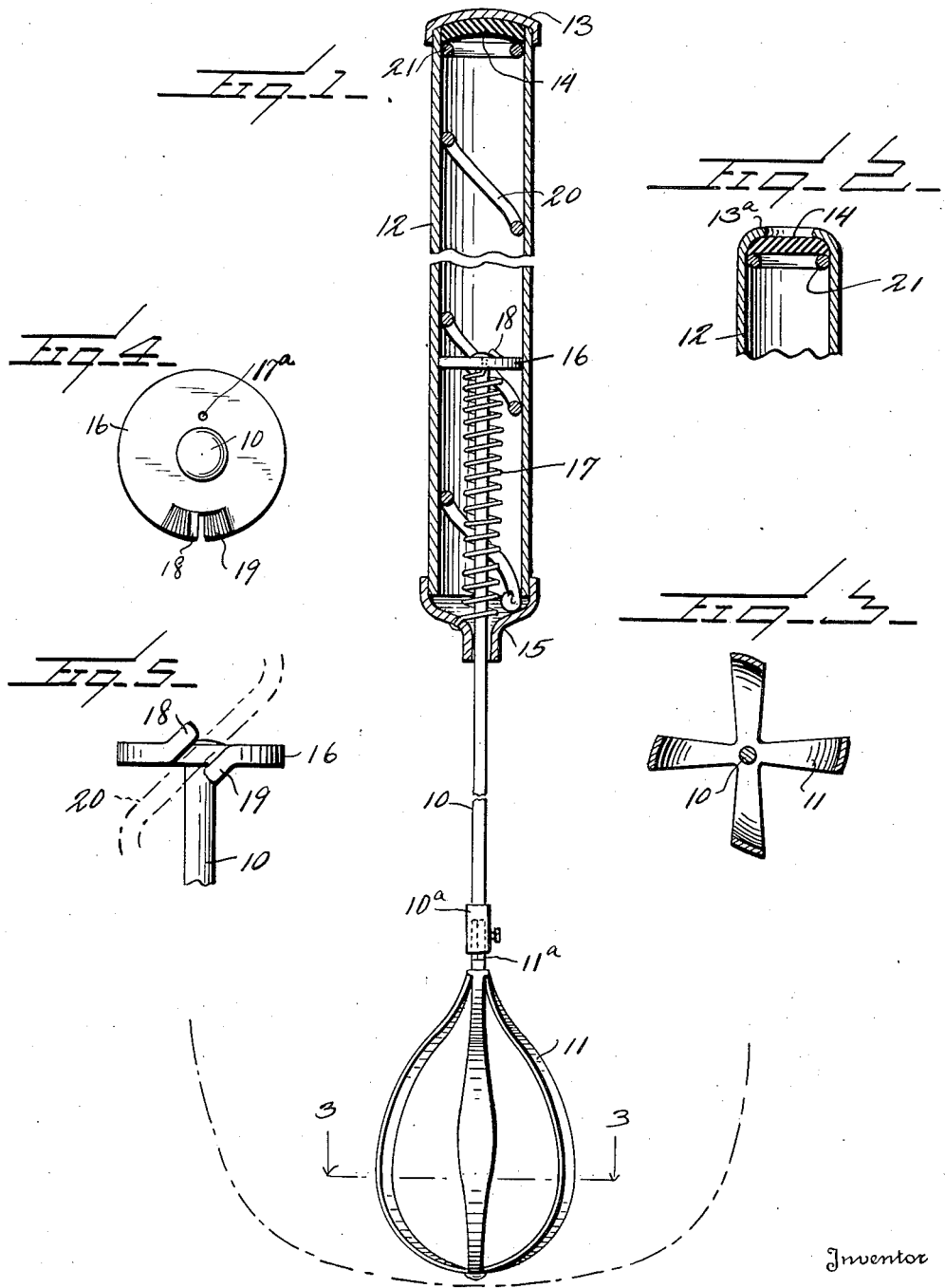

Patented Dec. 18, 1934

1,984,557

UNITED STATES PATENT OFFICE 1,984,557

MIXER AND BEATER

Charles Paul Werner, Jackson Heights, N. Y., assignor, by mesne assignments, to Duroi Products Corporation, New York, N. Y., a corporation of New York Application April 2, 1932, Serial No. 602,789

10 Claims. (Cl. 259—128)

This invention relates to mixers and beaters for use as kitchen utensils in beating and mixing malted milk, chocolate, eggs, etc., and the general object of the invention is to provide a mixer and beater which is very simple, which can be operated by one hand, leaving the other hand free to hold a mixing receptacle, which is easy to clean, neat, simple and inexpensive.

A further object is to provide a device of this character which is so constructed that the beating blades carried by the stem of the beater are inserted within the cup, bowl or other receptacle and the beater operated by depressing the handle of the beater, a spring acting to return the handle to its normal position upon the release of this pressure and the mechanism being such as to cause the beater on the end of the stem to rotate rapidly in one direction upon a depression of the handle and rotate rapidly in the other direction upon a release of the handle.

Other objects will appear in the course of the following description.

My invention is illustrated in the accompanying drawings, wherein:—

Figure 1 is a vertical sectional view of a beater constructed in accordance with one embodiment of my invention;

Figure 2 is a fragmentary sectional view showing a modification of the upper end of this beater;

Figure 3 is a section on the line 3—3 of Figure 1;

Figure 4 is a top plan view of the stem head shown in Figure 1;

Figure 5 is a side elevation of the structure shown in Figure 4;

Figure 6 is a top plan view of an integral stem head and stem;

Figure 7 is a side elevation of the integral stem head and stem;

Figure 8 is a transverse sectional view of the lower end of the handle showing a modified form of stem;

Figure 9 is a top plan view showing a modification of the beater, the operating stem being in section;

Figure 10 is a side elevation of the structure shown in Figure 9;

Fig. 11 is a fragmentary elevation of a modified handle.

Referring to Figure 1 it will be seen that the beater therein shown comprises a stem or shank 10 having at the lower end the beater blades 11. Operating over this shank 10 is the hollow handle 12 which may be closed at its upper end by means of a cap 13.

Disposed within the cap is preferably a rubber pad or washer 14. I do not wish to be limited to the use of a cap, as, as illustrated in Figure 2, the upper end of the handle 12 might be turned in as at 13a to thus hold the rubber washer 14 in place. The lower end of the handle 12 is closed by means of an annular member 15 which at its upper end fits around the lower end of the handle 12 and at its lower end is contracted to fit around the stem 10 to permit the stem to reciprocate easily relative to the handle.

The stem 10 in Figure 1 carries at its upper end a head 16 which approximately fits the interior diameter of the handle 12 and which is attached to the stem in any suitable manner and is rigid therewith. Attached at one end to this head, as for instance, through the hole 17a is a spiral contractile spring 17, the lower end of which may be attached to the annulus 15 if desired. It will be obvious now that if the handle be depressed that this spring 18 will be placed under tension and that when the pressure on the handle is released, the spring 17 will cause the handle to be lifted relative to the stem. The head is also formed in Figure 4 adjacent its margin with the two opposed tongues 18 and 19. The tongue 18 extends upward and outward and the tongue 19 extends downward and outward opposite to the tongue 18, thus defining a passageway between these tongues which is generally speaking a section of a spiral. Disposed within the handle 12 is a spiral element 20 which may be made of stiff wire. This wire at its upper end is formed into a circle as at 21 to fit against the rubber washer 14. The element 20 extends downward in a spiral to the lower end of the handle and at its lower end is attached to the handle or to the member 15.

If the wire from which the spiral element 20 is formed is sufficiently rigid, it is preferable to fasten only the lower end of the element 20 to the casing or handle leaving the upper end unattached as experience has shown me that this secures a softer and smoother operation. This is for the reason that the coils of the spiral 20 being free from attachment throughout the greater portion of the length of the spiral, can yield slightly as they pass between the tongues 18 and 19 or through the groove formed as shown in Figure 7, thus reducing frictional engagement between the walls of this groove, as for instance, between the lips 18 and 19 and the spiral wire 20. Attention is also called to the fact that the spring 17 is so disposed that the coil of the spring and the threads formed by the spiral 20 are in the same direction. A depression of the handle will, of course, cause a rotation of the stem in one direction, as for instance, as shown in Figure 1, in a clockwise direction with a rapidity depending upon the pitch of the spiral element 20. The rotation of the head 16 in a clockwise direction acts to turn the upper end of the spring 17 also in a clockwise direction, placing the spring 18 under tension both longitudinal and torsional and upon a release of pressure upon the handle, the spring will cause the handle to move upward relative to the stem and will cause the stem to rotate in a reverse direction to its original direction. Thus by alternately pressing downward and releasing the handle, the stem will be given very rapid rotations in alternately opposite directions. The speed of rotation will, of course, be determined by the operator. It is to be noted that if the spiral 20 and the coil of the spring 17 were in opposite directions, a rotation of the head 16 in a clockwise direction in Figure 1 would tend to wind up or tighten the coils of the spring 17 upon the stem 10 and cause this spring 17 to bind on the stem. By unwinding the coil 17, however, as the spring 17 is compressed, the coil enlarges while it is placed under torsional stress and compression so that it does not act to bind on the stem 10. I do not wish to be limited to the particular form of the agitator but preferably the agitator blades 11 will be attached rigidly to the lower end of the stem, will extend upward and outward in a regular curve and then inward and upward in a flattened curve and preferably the blades will be widest at a point just below the middle of the blades and the blades will be disposed as illustrated in Figure 3 tangentially to a circle whose center is the axis of stem 10.

Spiral or other blades might be used, however, on the lower end of the stem 10 or as explained later a plurality of sets of blades may be operated by the stem 10.

While I have illustrated in Figure 1 the stem head 10 as being very simply formed for engagement with the spiral element 20, I do not wish to be limited to this as it is possible to form this stem head from the stem itself as illustrated in Figure 7 where the extremity of the upper end of the stem is bent to form a spiral guide as at 16a, this spiral guide embracing the spiral element 20 and constituting a guideway defining a section of a spiral so as to have what might be termed threaded engagement with the element 20. It will be obvious that the same result may be secured with the construction shown in Figure 7 as with the construction shown in Figure 1.

By the term "stem head" I include any element which may be attached to or formed as part of the stem and which carries or forms a spiral guideway or thread within which the spiral element 20 may be engaged. Thus in Figure 8, I have illustrated a stem head 16b which is cylindrical in form and encloses the spring 18 and to the exterior of this cylindrical stem head are attached two spiral wires 22 between which the spiral element 20 operates. Otherwise than this the construction shown in Figure 8, is the same as that shown in Figure 1. In Figure 10, I show the manner in which three agitators or beaters may be operated by the single stem. In this construction, a frame 23 is provided through the middle of which the stem freely passes. Attached to the stem 10 is a gear wheel 24 which carries upon it the beater 25. The vertical end members of the frame constitute spindles upon which the beaters 26 and 27 are mounted, these beaters carrying upon them gear wheels 28, these gear wheels meshing with the gear wheel 24.

It will thus be obvious that the beaters 26 will turn in reverse directions to the beater 24 and the blades or beaters are so set that they will at no time come in contact with each other as they rotate.

While in Figure 1 I illustrate a metal handle which is tubular and carries the cap 15 at its lower end and is closed at its upper end by the rubber washer 14 and cap 13, I do not wish to be limited to this and in Figure 11 I show a wooden handle 29 fitting over a metallic casing designated 12a which casing is open at the top. The lower end of this wooden handle is engaged by a metal cap 15a held in place upon the wooden handle by the indented portions 30. This cap acts as a guide for the stem 10 and at the same time holds the sleeve or tubular member 12a and the spiral such as the spiral 20 in place within the wooden handle. This simplifies the manufacture of the article considerably.

In Figure 1 I have also shown the extremity of the stem 10 as being formed with a socket 10a which receives the central stem of the beater 11. Thus various forms of beaters may be detachably mounted upon the same stem. Thus the beater shown in Figure 10 may be interchanged with the beater shown in Fig. 1 or any other desired beater.

While I have heretofore referred to this device as being particularly adapted as a beater or mixer, I do not wish to be limited to this as it is obvious that a drill might be constructed along the same lines only substituting a drill point or bit for the beater on the lower end of the stem.

While I have illustrated several different embodiments of my invention, it will be obvious that minor modifications might be made in all of these forms without departing from the spirit of the invention as defined in the appended claims.

I claim:—

1. A mixer and beater including a beater stem, a hollow handle telescoping over the stem, a rigid spiral element separate from but attached at its lower end to the handle the remainder of the spiral element being free from attachment to the handle, and extending within the handle toward the upper end thereof, a coiled spring resisting downward movement of the handle relative to the stem, and a member carried by the stem and rotatable therewith and disposed within the handle, said member being formed to provide a guideway defining a section of a spiral and with which the rigid spiral element engages.

2. A mixer and beater of the character described, including a beater stem, a hollow handle telescoping over the stem, a rigid spiral element separate from but mounted within and carried by the hollow handle, the spiral element being unattached to the handle throughout the greater portion of its length, a coiled contractile spring attached at its lower end to the handle and at its upper end to the beater stem and resisting downward movement of the handle relative to the stem, and a head carried by the stem and disposed within the handle and formed to provide a guideway defining a section of a spiral with which the rigid element engages.

3. A mixer and beater of the character described, including a beater stem, a hollow handle telescoping over the stem, a rigid spiral element separate from but mounted within and carried by the hollow handle but unattached thereto throughout the greater portion of its length, a coiled contractile spring attached at its lower end to the handle and at its upper end to the beater stem to rotate therewith and resisting downward movement of the handle relative to the stem, and a head rigidly mounted on the stem and having a diameter approximately equal to the interior diameter of the handle, the head adjacent its circumference being formed with opposed tongues, one of the tongues being turned upward and circumferentially and the other tongue being turned downward and circumferentially, the tongues constituting a guideway defining a section of a spiral, the rigid spiral element extending between these tongues.

4. A mixer and beater of the character described, including a beater stem, a hollow handle telescoping over the stem, a rigid spiral element separate from but mounted within and carried by the hollow handle, a coiled contractile spring attached at its lower end to the handle and at its upper end to the beater stem and resisting downward movement of the handle relative to the stem and resisting rotation of the stem, a head carried by the stem and rigid therewith and disposed within the handle, the head being cylindrical in form and enclosing the spiral spring, the exterior of the cylindrical head being formed with two spiral members defining a spiral channel within which the rigid spiral element engages.

5. A mixer and beater of the character described including a stem, a hollow handle telescoping over the stem, a rigid spiral element disposed within and attached to the handle and extending the full length thereof, a coiled spring disposed within the handle and resisting downward movement of the handle relative to the stem and resisting rotational movement of the stem relative to the handle, the upper end of the stem being bent to form a spiral guideway approximately concentric to the stem and with which the rigid spiral element engages to cause a rotation of the stem as the handle is depressed or raised relative to the stem.

6. In a device of the character described, a rotatable stem, a hollow handle concentrically placed over said stem, a spiraling element of stiff wire fitting the inside of said handle but separate therefrom for the greater portion of its length, and a disk head on said stem which is grooved at one edge in such a manner as to correspond with the pitch of the spiral and to have contact with the spiral from a point below to a point above the respective surfaces of the disk whereby said head will follow the turns of said spiral and longitudinal axial reciprocation of said handle will rotate said stem first in one direction and then in the other direction.

7. In a device of the character described, a rotatable stem, a hollow handle concentrically placed over said stem, a spiraling element arranged in the inside of said handle but separate therefrom for the greater portion of its length, a head on said stem to follow the turns of said element, and a restoring spring surrounding said stem and connected between said head and said handle whereby longitudinal axial movement of said handle over said stem in which the stem moves into the interior of said handle, is resisted.

8. In a device of the character described, a rotatable stem, a hollow handle concentrically placed over said stem, a spiraling element disposed within the handle, a head on said stem formed to engage with and to follow the turns of said spiraling element and a restoring spring surrounding said stem and connected between the head and said handle whereby longitudinal movement of said handle over said stem in which the stem moves into the interior of the handle is resisted, the spring having its coils disposed in such a direction relative to the spiral that the spring will be caused to unwind against its tension while being compressed.

9. In a device of the character described, a rotatable stem, a hollow handle concentrically placed over said stem, a spiraling element arranged in the inside of said handle but unattached to that portion of the handle concentric to the stem whereby said spiraling element between the ends of the handle may have movement independent of the handle and a head on said stem formed to follow the turns of said element whereby longitudinally axial reciprocation of said handle will rotate said stem first in one direction and then in the other direction.

10. A mixer and beater of the character described, including a beater stem, a hollow handle telescoping over the stem, a spiral element carried by the handle and disposed within the latter, a member carried by the stem and with which the spiral element engages as the handle is shifted relative to the stem to cause a rotation of the stem, a coiled contractile spring attached to the lower end of the handle and to the upper end of the stem and resisting downward movement of the handle and resisting rotation of the stem in one direction, said contractile spring having its coils pitched in the same direction as the pitch of said spiral element whereby to cause the spring to be placed under torsional stress as it is compressed to thus cause the diametric enlargement of the spring as its coils are compressed.

CHARLES PAUL WERNER.